May 9, 1933.  H. G. PROUTY ET AL  1,907,665
COTTON HARVESTING MACHINE
Filed Oct. 15, 1929  8 Sheets-Sheet 5

May 9, 1933.  H. G. PROUTY ET AL  1,907,665
COTTON HARVESTING MACHINE
Filed Oct. 15, 1929   8 Sheets-Sheet 6

Fig. 7.

Inventor
Harris G. Prouty &
Joseph Bardwell
by Arthur T. Randall
Atty.

Patented May 9, 1933

1,907,665

UNITED STATES PATENT OFFICE

HARRIS G. PROUTY AND JOSEPH BARDWELL, OF WHITMAN, MASSACHUSETTS

COTTON HARVESTING MACHINE

Application filed October 15, 1929. Serial No. 399,848.

Our invention relates to cotton harvesting machines and it has for its object to improve the construction and operation of machines of this class.

To this end we have provided a cotton harvesting machine having the peculiar features of construction and mode of operation set forth in the following description, the several novel features of the invention being particularly pointed out and defined in the claims at the close thereof.

In the embodiment of our invention herein illustrated the machine is constructed as a motor propelled vehicle adapted to travel over the ground along a row of cotton plants, and as it traverses said row a multiplicity of picker elements carried thereby are moved into and out of the plants so as to remove the cotton bolls therefrom.

In the best form of our invention the multiplicity of picker elements are mounted upon a carriage that is movable on the frame of the vehicle toward and from the plants of the row and the machine is automatically controlled and operated so as to move intermittently along the row of plants and so that during each period of rest of the machine the picker element carriage is operated to move said elements into and out of the plants.

It is a feature of our invention that the same motor which propels the vehicle over the ground is utilized also to operate the picker carriage and, in the best form of our invention, said motor operates the picker elements also.

It is also a feature of our invention that manually operated control mechanism is provided by means of which the picking mechanism may be rendered in-operative when it is desired to drive the vehicle idly over the ground as when traveling from one place, or field, to another.

Other features of our invention are hereinafter pointed out.

In the accompanying drawings:

Figure 3 is a section on line 3—3 of Figure 1.

Figure 3a is a sectional detail of a portion of the driving mechanism for the main shaft, hereinafter referred to.

Figure 11 is a side view partly in section and broken away of one of the picker stems hereinafter referred to.

The machine herein illustrated includes a pair of traction belts 1, 1 extending around wheels 2, 2 each fast on an axle 3 journaled in a bearing 4 provided on the frame of the machine. Each of the two rear axles 3 has fast thereon a sprocket wheel 5 connected by a chain 6 with a sprocket wheel fast on the main driving differential shaft 8 of a transmission mechanism T.

This transmission mechanism T is of the well known standard construction employed in tractors and includes a power driven shaft 9 that is connected through the usual power transmitting mechanism with the shaft 8 that is driven by it.

The transmission mechanism T is provided as usual with a manually operated control member by means of which the shaft 8 is started, stopped and reversed. Also, as usual, the shaft 8 is made up of two sections connected, respectively, with the chains 6, said two sections being themselves connected by the usual differential, not shown, that is controlled by means of a hand wheel D to steer the vehicle as it travels over the ground.

E is the usual manually operated member or lever by means of which the usual break device, not shown, of transmission T is operated and controlled.

Figure 1:
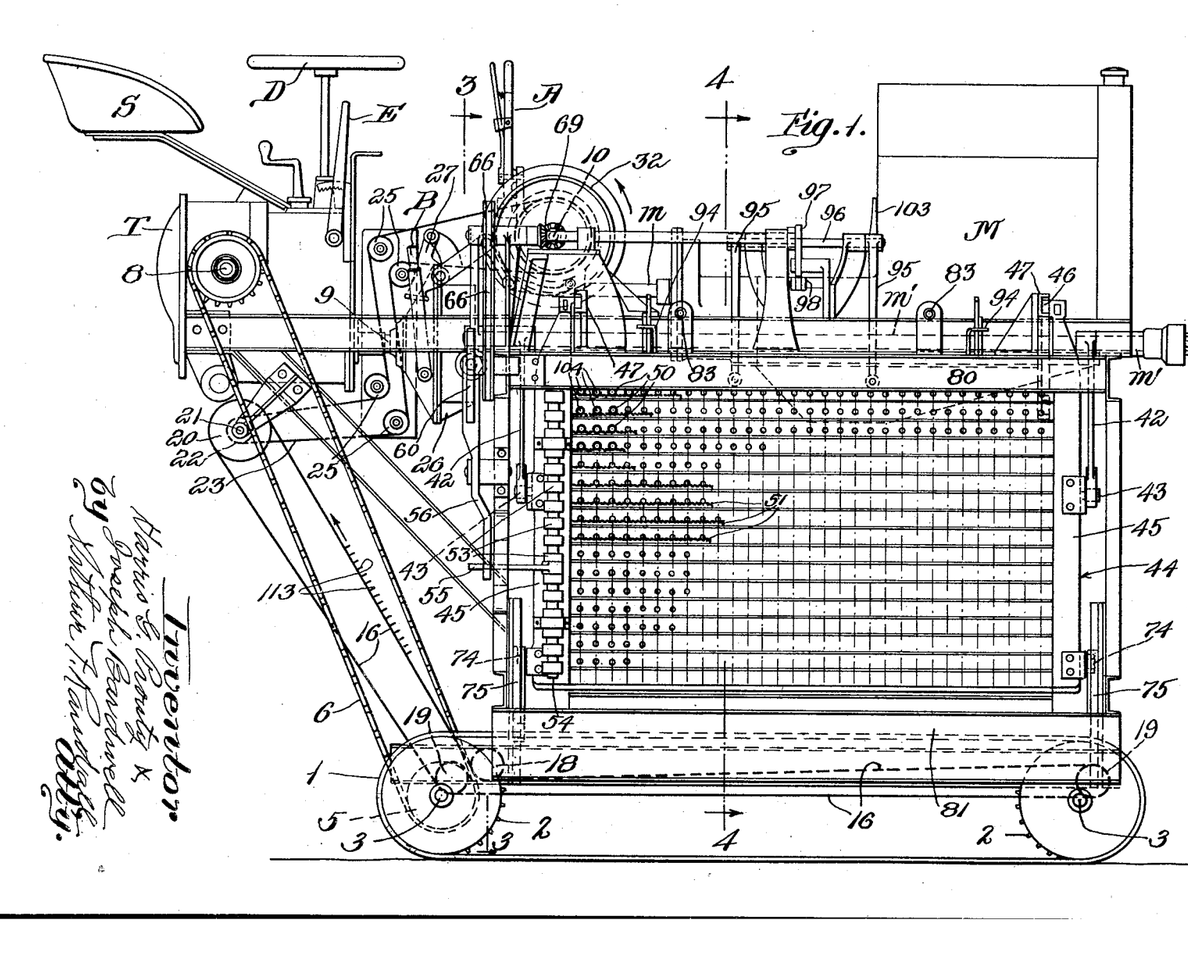
Figure 1 is a side elevation of a cotton harvesting machine constructed in accordance with our invention.

The picker mechanism includes a main drive shaft 10 which, during the operation of the machine, is continuously driven in the direction indicated by the arrow in Fig. 1, by a motor M. This motor M preferably is a gas engine which includes as a part thereof a rearwardly extending shaft $m$ which is continuously rotating when the motor is in operation. The motor M as shown, including the shaft $m$, is of a standard type such as is employed in tractors.

Figures 3, 3A:
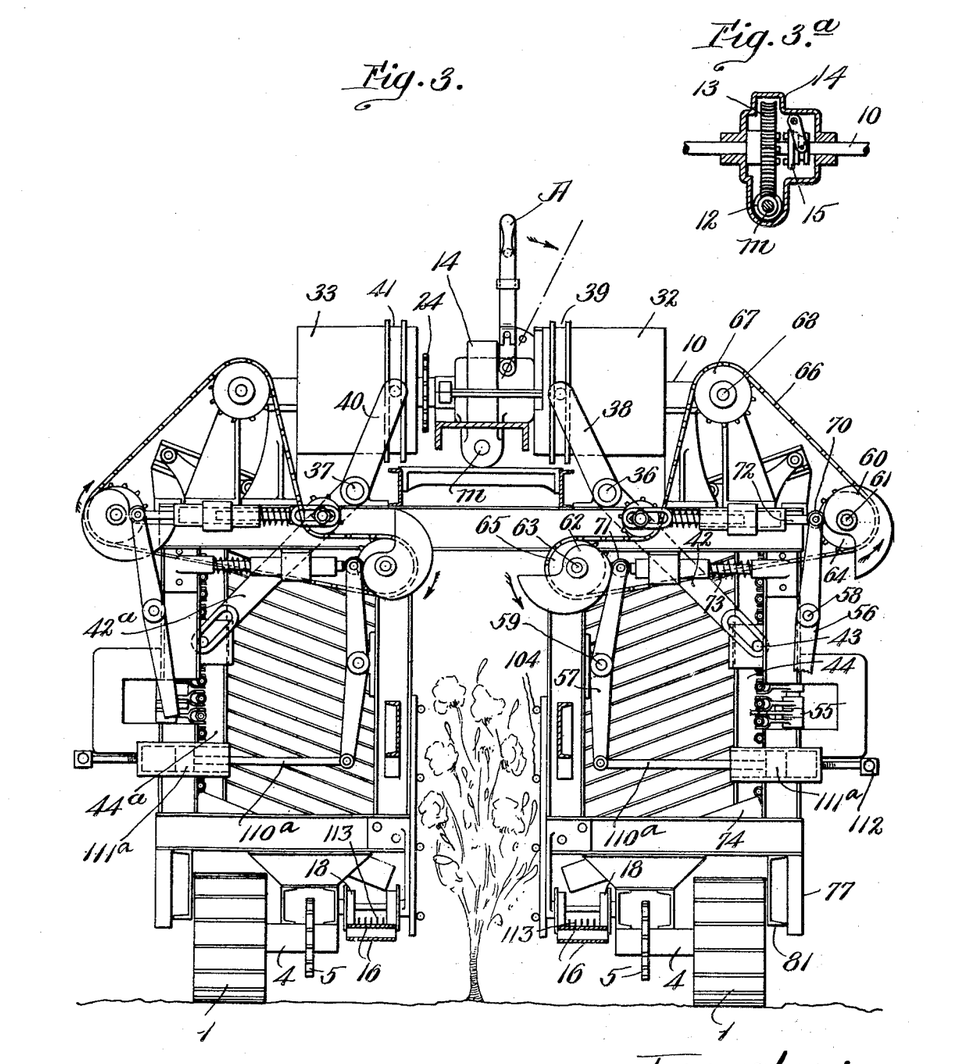

The shaft $m$ has fixed upon its rear end portion a worm 12, Fig. 3a, that continuously drives a worm gear 13 loosely mounted upon the main shaft 10 within a housing 14 and constituting one member of a clutch whereof the other member 15 is splined on shaft 10 alongside of gear 13 and engaged by one arm of a control lever A fulcrumed on the housing 14. One arm of this control lever A is within the housing 14 so as to engage the movable clutch member 15, while the other arm thereof is exteriorly arranged and within reach of the operator of the machine from his position upon a seat S that is fastened in position on top of the frame or housing of transmission T.

In Fig. 3 the lever A is shown by full lines in the position it occupies when the movable clutch member 15 is out of engagement with the worm gear 13 and shaft 10 is therefor at rest. It will be clear that when control lever A is swung toward the right, Fig. 3, into the position indicated by the dotted line the worm gear 13 that is continuously driven by the motor M will then be positively connected with main shaft 10 by clutch member 15 and said shaft 10 will be continuously driven.

This is the condition that exists when the machine is traversing a row of plants and picking cotton. When the machine is being driven idly over the ground from one place to another the control lever A will occupy the position shown by full lines in Fig. 3 and shaft 10 will remain at rest.

During the operation of the machine the cotton removed from the plants by the picking mechanism is deposited upon the upper horizontal stretches of a pair of endless belts 16 extending lengthwise of the machine and occupying positions to receive upon them the picked cotton when it is stripped from the picker elements as presently to be described.

Each endless belt 16 extends around supporting rolls 18, 19 and 20 journaled in bearings on the frame of the machine, the rolls 18 and 19 being located adjacent the base of said frame, while the rolls 20 occupy elevated positions at the rear of said frame.

The two upper rolls 20 are fast on a shaft 21 carrying a sprocket wheel 22 connected by an endless sprocket chain 23 with a sprocket wheel 24, Figs. 1 and 3, fast on the main drive shaft 10 of the picker mechanism. It will therefore be clear that when the machine is in operation shaft 10 continuously drives the belt 16 in the direction indicated by the arrow in Fig. 1 so that whatever cotton falls upon the top horizontal stretch of said belt will be moved rearwardly and then upwardly to the wheels 20 where it will be discharged from said belt into a bag or other receptacle, not shown, attached to the frame of the machine and supported in a position to receive the same. It will thus be clear that as fast as the cotton is picked it is conveyed rearwardly and upwardly by the endless belt 16 and deposited within a bag or other receptacle.

The endless sprocket chain 23 is supported and guided intermediate the sprocket wheels 22 and 24 by guide rolls 25 journaled on the frame of the machine.

As shown in Fig. 3, the lower part of the frame of the machine is made up of two side sections which are separated so as to leave between them a passageway for the cotton plants, and one of the traction belts 1 is disposed at one side of the row beneath one of said side sections while the other traction belt is disposed at the opposite side of the row beneath the other side section.

The crank shaft $m'$ of motor M extends rearwardly from the latter into the case or housing of a clutch 26 of ordinary construction by means of which the crank shaft $m'$ is at times connected with the driven shaft 9 of the transmission T.

Figures 8, 9:
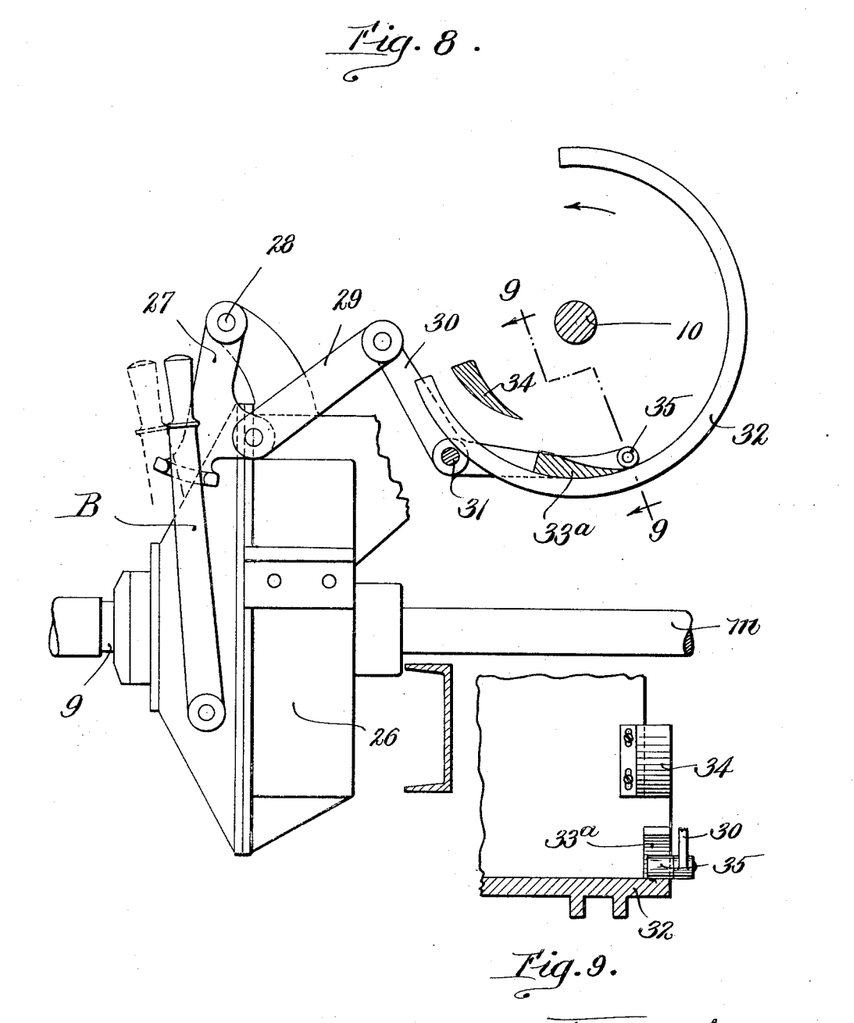
Figures 8 and 9 are details partly in section illustrating the automatic control mechanism by means of which the travel of the vehicle over the ground is started and stopped.

The clutch 26, Figs. 1, 8 and 9, includes a lever control member B by means of which said clutch is operated to connect and disconnect the shafts $m'$ and 9. This lever control member B is upon the outside of the case or housing of the clutch and its upper end is embraced by a forked lever 27 fulcrumed at 28 on the housing of the clutch and connected by a link 29 with one arm of a lever 30 fulcrumed at 31 on the frame of the machine.

Fast on the continuously driven main shaft 10 of the picking mechanism are two cam drums 32 and 33 and the inner end portion of the drum 32 which is made hollow is provided upon its interior with two cams 33a and 34 to co-operate with a cam roll 35 provided on the other arm of the lever 30.

In the illustrated embodiment of our invention two mechanisms for picking the cotton are provided, one at each side of the machine, and cam drum 32 is part of one mechanism, while cam drum 33 is part of the other mechanism.

The following description has to do, in most part, with the picking mechanism upon the right hand side of the machine but it is to be understood that the picking mechanism upon the opposite side of the machine is a counterpart of that upon the right hand side of the machine, although during each cycle of the machine the two mechanisms operate successively to strip the cotton from the plants as will presently be described.

During the operation of the machine the cam drum 32 rotates continuously in the direction of the arrow, Fig. 8, and during each revolution thereof the cam 33 first acts through the lever 30, link 29 and lever 27 to shift the control lever B from the position shown in full lines to the position shown in dotted lines. When the control lever B occupies the position shown by full lines in Fig. 8, the motor crank shaft $m'$ is disconnected from the shaft 9 of the transmission T, but when said lever is shifted from the full line position into the dotted line position, the clutch 26 is set and the crank shaft $m'$ drives the transmission shaft 9 thereby rotating the two-part shaft 8 of the transmission so that the latter acts through the chains 6 and sprockets 5 and 7 to propel the vehicle forward over the ground.

The crank shaft $m'$ is thus held clutched to the transmissions shaft 9 for a short interval of time during which the vehicle is propelled forward a predetermined distance. The forward movement of the vehicle over the ground is terminated by the engagement of the second cam 34 with roll 35 which acts through lever 30, link 29 and lever 27 to restore lever B to its full line position thereby disconnecting crank shaft $m'$ from the transmission shaft 9 and stopping the vehicle. The vehicle is thus started, moved forward and stopped automatically during one quarter of a revolution of the cam drum 32. During the remaining three quarters of the revolution of the drum 32, and while the vehicle is at rest, the two picker mechanisms referred to are operated.

Hereinabove we have referred to the lower part of the frame of the machine as being constructed in two sections and as herein shown each of these sections is equipped with picking mechanism which travels along one side of the row of plants, while the other mechanism travels along the opposite side thereof, and it is a feature of this machine that these two picking mechanisms are alternately operated during each period of rest of the vehicle.

Adjacent the top of the frame of the machine there are provided two longitudinally disposed shafts 36 and 37 journaled in bearings on said frame, shaft 36 being provided adjacent its rear end with an arm 38 carrying a cam roll occupying a cam groove 39 provided upon the exterior of the drum 32, while shaft 37 is provided adjacent its rear end with a similar arm 40 carrying a cam roll occupying a cam groove 41 provided upon the exterior of the drum 33.

Figure 2:
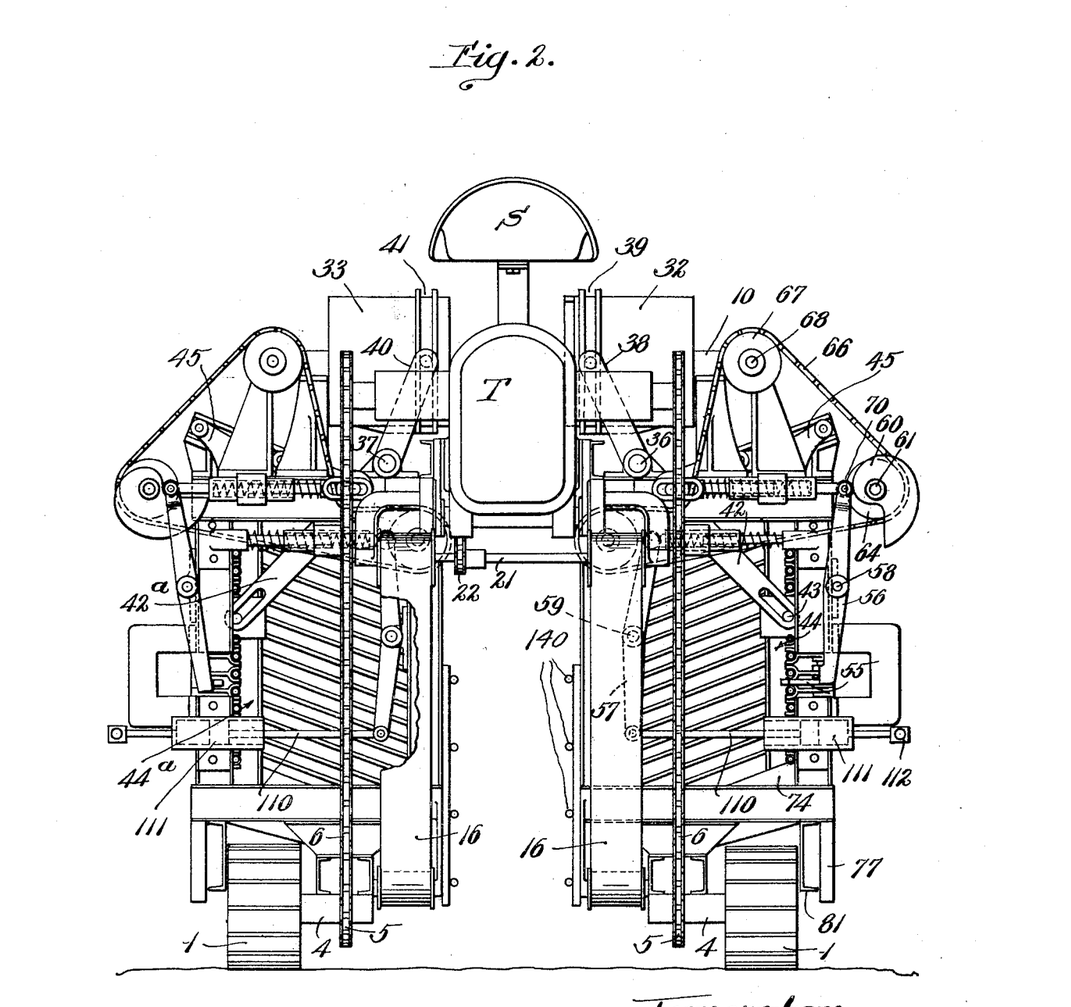
Figure 2 is a rear elevation of the machine shown in Figure 1, that is, viewing the machine of Figure 1 from the left thereof.

As the lever 30 is restored to its normal position by the cam 34, Fig. 8, to disconnect the shafts $m'$ and 9, the cam groove 39, Fig. 2, swings the arm 38 toward the right where it dwells momentarily and then is restored by the cam groove 39 to its normal position again. Simultaneously with the start of the return of arm 38 toward its normal position shown in Fig. 2, the cam groove 41 starts to swing the arm 40 toward the left to the limit of the throw of cam 41 in that direction. As the arm 38 is returned to the position shown in Fig. 2 the arm 40 reaches the limit of its movement toward the left where it dwells momentarily, after which it is swung back again by cam groove 41 to its normal position shown in Fig. 2 where it dwells for the remainder of the cycle of the machine.

It is to be understood that during each cycle of the machine the main shaft 10 makes one revolution and at a definite time with respect to the operation of the clutch 26 the cams 39 and 41 operate first to swing the arm 38 toward the right; then to swing both arms 38 and 40 toward the left, and then to swing arm 40 back toward the right to its normal position again. Thus, the two shafts 36 and 37 are rocked in timed relation with each other and with respect to the operation of the clutch 26.

Near each end thereof the shaft 36 has fast on it a downwardly extending arm 42 formed near its lower free end with a slot that is occupied by a stud 43 projecting from the adjacent end of a picker carriage frame 44 which includes two vertically disposed bars 45, one at each end thereof. Each bar 45 of carriage 44 is provided at its upper end with a pair of trucks or rolls 46 mounted within inclined runways 47 forming part of the frame of the machine.

It will thus be clear that when the shaft 36 is rocked by the cam drum 32 as above described it acts through the two arms 42 to move the carriage 44 inwardly along its runways 47 and then back again to the position from which it started.

The opposite side of the machine is likewise provided with a carriage 44a connected by arms 42a with the rock shaft 37 and it should therefore be clear that when the arms 42 start to move the carriage 44 from its innermost position to its outermost position, the arms 42a start to move the carriage 44a from its outermost position toward its innermost position.

Thus during the operation of the machine the carriage 44 first moves inwardly to the limit of its movement toward the plants, then both carriage 44 and carriage 44a move in unison toward the right, Figs. 2 and 3, to the limit of their movements in that direction, and then the carriage 44a moves toward the left to the limit of its movement in that direction.

Immediately upon the conclusion of the movement of the carriage 44a toward the left, Figs. 2 and 3, the cam 32, Fig. 8, operates through the connections described to set the clutch 26 thus causing the vehicle to move forward over the ground a predetermined distance depending upon the angular distance between cams 33a and 34 which, as stated, is about ninety degrees.

Figure 5:
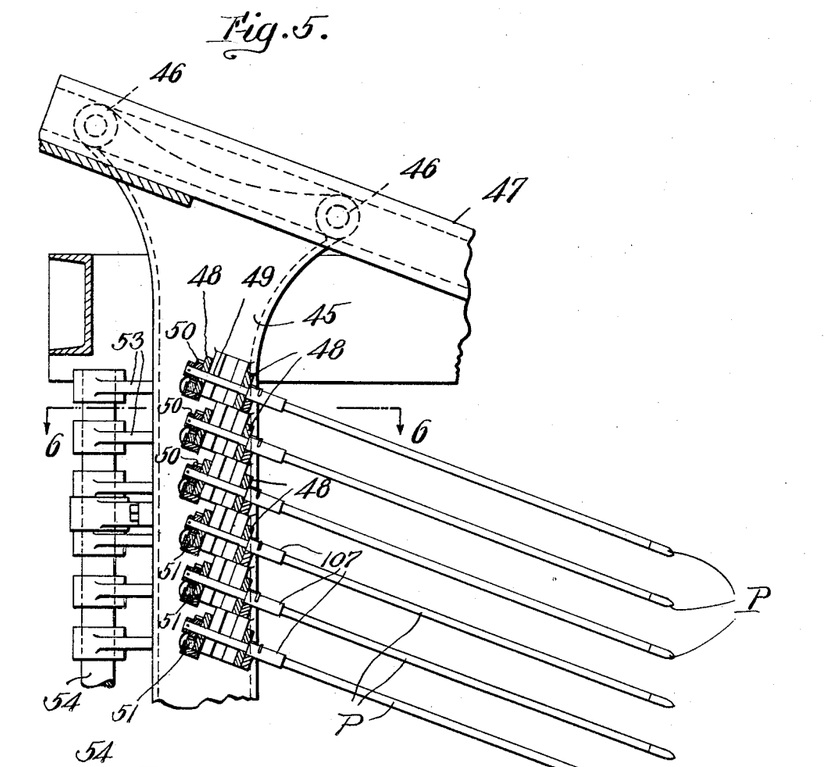
Figure 5 is a sectional detail, looking rearwardly and on a larger scale, of a portion of the picker mechanism.
Figure 6:
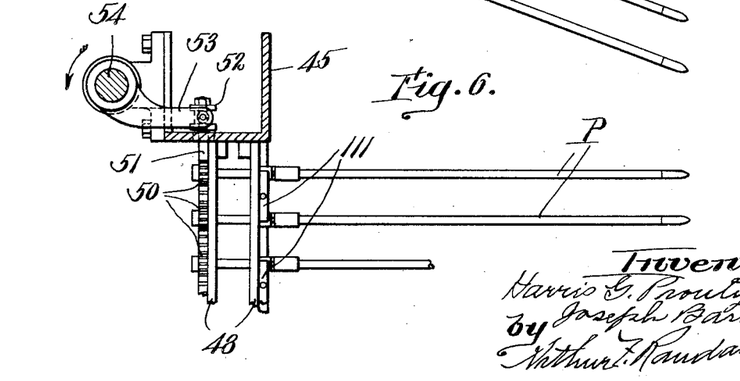
Figure 6 is a section on line 6—6 of Figure 5.
Figure 11:
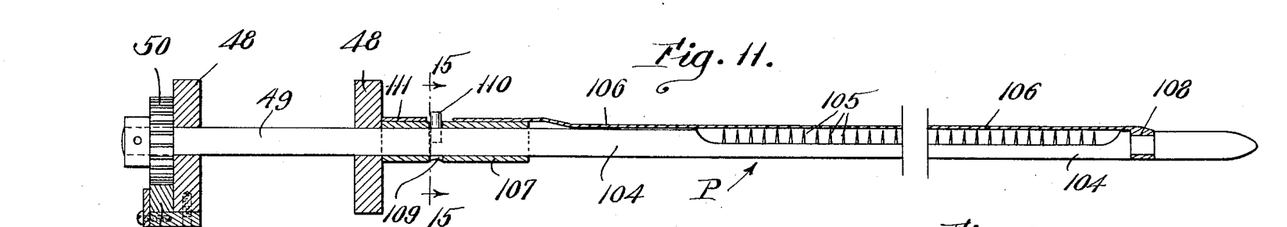

The frame of carriage 44 includes a plurality of cross-bars 48 fastened at their ends to the vertical end bars 45, and these cross-bars 48 are apertured to provide bearings for the shank portions 49, Figs. 5, 6 and 11, of a multiplicity of picker stems P which are preferably constructed as shown and described in U. S. Patent No. 1,543,089, granted June 23, 1925, and as illustrated in Figs. 12 to 15, inclusive.

These picker stems P are arranged in vertical and horizontal rows as shown in Fig. 1 and each pair of cross-bars 48 support a horizontal row of picker stems that are uniformly spaced apart throughout its length, each picker stem having a pinion 50 secured to its outer end, Fig. 5.

The pinions 50 of each horizontal row are all engaged by a rack-bar 51 supported in guide-ways provided upon the outer cross-bar 48, and at its rear end each rack-bar 51 extends loosely through an aperture provided in the rear vertical end bar 45 of the picker carriage 44. Said rear end is provided with a grooved collar 52, Fig. 6, that is engaged by a stud provided at the free end of an arm 53 fast on a vertical shaft 54 journaled in bearings on the rear bar 45.

This vertical shaft 54 also carries a rearwardly extending arm 55 that is adapted to co-operate with two levers 56 and 57 fulcrumed, respectively, at 58 and 59 on the frame of the machine.

Lever 56 has an upwardly extending arm provided at its upper end with a cam roll 70 co-operating with a cam 60 fast on a shaft 61 journaled in bearings on the frame of the machine, while the lever 57 has an upwardly extending arm provided at its upper end with a cam roll 71 co-operating with a cam 62 fast on a shaft 63 journaled in bearings on the frame of the machine.

The shafts 61 and 63 carry, respectively, sprocket wheels 64 and 65 connected by an endless chain 66 with a sprocket wheel 67 fast on a longitudinally disposed shaft 68 journaled in bearings provided on the frame of the machine. Shaft 68, Fig. 1, is connected through miter gears 69 with the main drive shaft 10 of the picker mechanism. It will therefore be clear that the cams 60 and 62 are continuously driven in timed relation with the cam drum 32 in the directions indicated by the arrows in Fig. 3 and serve to alternately operate the levers 56 and 57.

The cam roll 70 is strongly urged toward the cam 60 by a spring pressed plunger 72 slidably mounted on the frame of the machine, while the cam roll 71 is strongly urged toward the cam 62 by a spring pressed plunger 73 that is also slidably mounted on the frame of the machine.

When during the operation of the machine the picker frame 44 reaches the limit of its inward movement the cam 62 falls away suddenly from the cam roll 71 whereupon the spring pressed plunger 73 operates to quickly swing the lower arm of lever 57 toward the right, Fig. 3. At this moment the arm 55 on shaft 54 is against, and in the path of, the lower arm of lever 57 so that the latter, when operated by the spring pressed plunger 73 as described, acts through the arm 55 to rock shaft 54 in the direction of the arrow, Fig. 6, so as to cause the arms 53 to slide all of the rack-bars 51 endwise in one direction thereby rotating the spindles of all of the picker stems P. This rotation of the spindles of the picker stems occurs when the carriage 44 is at the limit of its movement toward the row of plants and while said picker stems are projected among the branches of the plants as indicated by dotted lines in Fig. 4.

When the picker stems P are thus rotated the spindle 104 of each, Figs. 11–15, is rotated in the direction indicated by the arrow to the extent of one revolution thereby unsheathing the teeth 105 of the stem so as to cause the latter to engage the cotton that is in engagement with the stem.

The sheath or guard 106 of each picker is a thin strip or bar disposed close to and parallel with the spindle 104, being provided at one end with a hub or sleeve 107 rotatably mounted upon the spindle 104 and at its opposite outer end it is rotatably connected with a reduced portion 108 of the spindle 104. The sleeve or hub 107 at the inner end of the sheath or guard 106 is made with a circumferential slot 109 that is occupied by a pin or stud 110 projecting from the spindle 104. This slot 109 is one hundred and eighty degrees in length so that it is possible for the spindle 104 and sheath 106 to rotate relatively to the extent of one-half of a revolution.

A spring shoe 111 supported by the adjacent cross-bar 48 presses against the sleeve 107 and yieldingly opposes rotation of said sleeve.

Figures 12, 15:
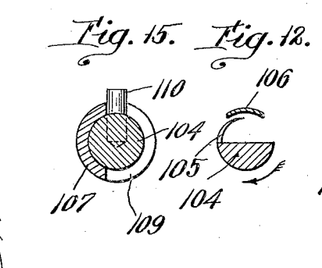
Figures 12, 13 and 14 are sectional views illustrating the operation of the picker stem shown in Figure 11.
Figure 15 is a section on line 15—15 of Figure 11.
Figure 13:
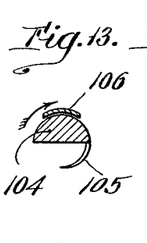
Figure 14:
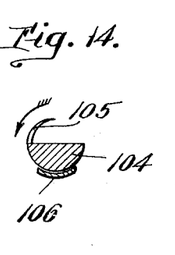

When the carriage 44 is moved inwardly to carry the picker stems into the plants, the sheath 106 and spindle 104 of each picker stem are positioned relatively as shown in Fig. 12, but when the picker stems are rotated in one direction as just described the spindle 104 turns independently of the sheath 106 for half of a revolution bringing the parts into the relative positions shown in Fig. 13. Then, as the spindle 104 completes its rotary movement the pin or stud 110 causes the sheath 106 to move with the spindle so that at the completion of the one revolution thereof the parts occupy the relative positions shown in Fig. 14. In this way whatever bolls are in contact with a picker stem are engaged by the teeth 106 of the latter and partly wound on to the picker stem.

Immediately after the picker stems are rotated in one direction as described, the carriage 44 is moved outwardly withdrawing the picker stems from the plants and when it reaches its normal outermost position the arm 55 is against and directly in the path of the lower arm of lever 56. As the arm 55 arrives at this position the cam 60 falls away from the roll 70 and the spring pressed plunger 72 thereupon swings the lever 56 in a direction to cause the latter to act through the arm 55 and rock shaft 54 to shift all of the rack-bars 51 endwise back to their normal positions thereby reversely rotating the spindles of the picker stems which frees the cotton therefrom and restores the parts of each stem to their normal relative positions shown in Fig. 12.

The power transmitting mechanism above described which connects the main drive shaft 10 with the two shafts 61 and 63 operates to drive said two shafts at the same speed as the shaft 10.

When the carriage 44 is moved back and forth as above described the lower portion thereof is guided by two trucks 74 mounted upon the opposite ends of said carriage and movable in inclined runways 75 on the frame of the machine which are parallel with the runways 47.

Figure 10:
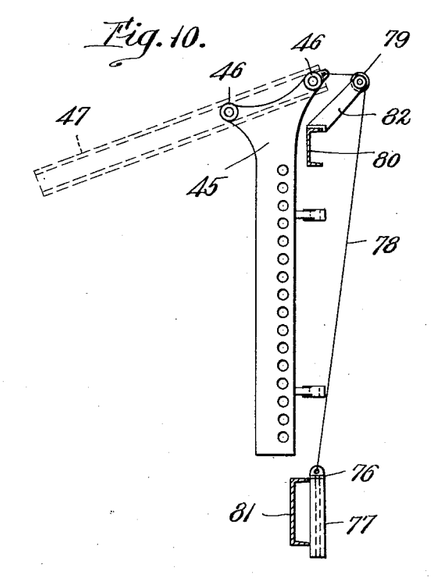
Figure 10 is a view illustrating the carriage counterbalancing devices hereinafter described.

If desired a counterbalancing weight 76, Fig. 10, movably mounted in vertical guideways 77 on the frame of the machine may be provided, that is connected adjacent each end thereof with the upper end of the adjacent end bar 45 of the carriage 44 by means of a cable 78 extending around a guide pulley 79 on the frame of the machine. At each side of the machine the frame thereof is constructed with an upper longitudinal side bar 80, Figs. 1 and 10, and a lower longitudinal side bar 81, and the pulley 79 may be mounted upon a bracket 82 secured to the upper bar 80 while the guideways 77 may be fixed to the outer side of the lower bar 81, one near each end thereof. For the sake of clearness this counterbalancing mechanism, with the exception of the guideways 77, is omitted from all of the figures of the drawings except Fig. 10.

Figure 4:
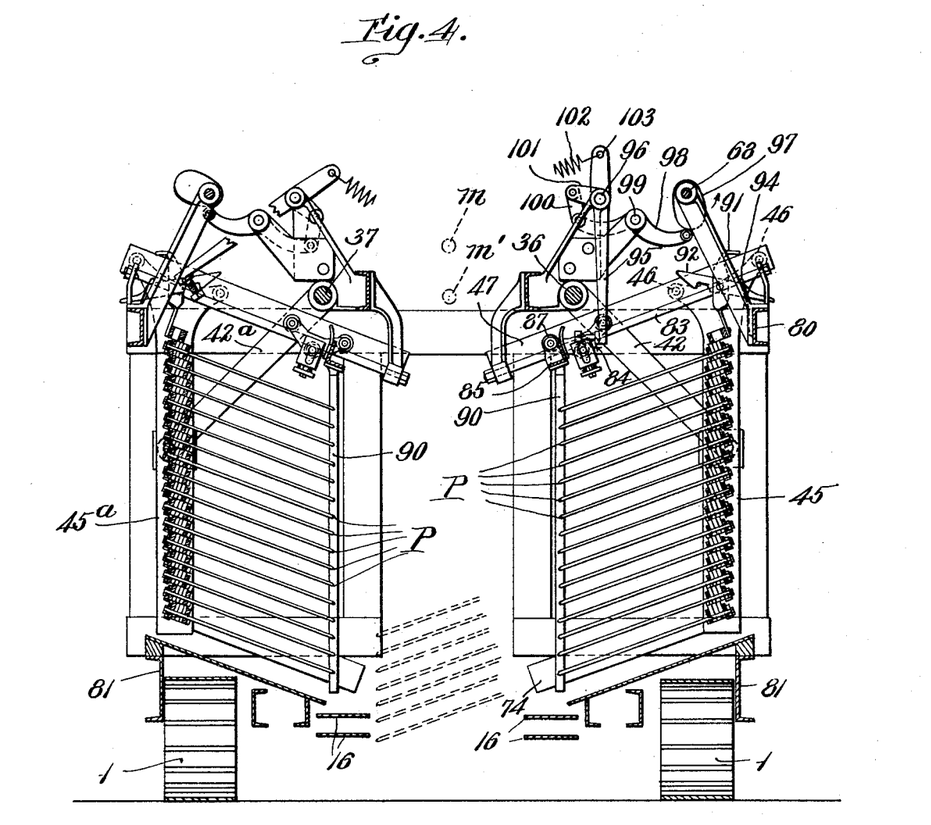
Figure 4 is a section on line 4—4 of Figure 1.
Figure 7:
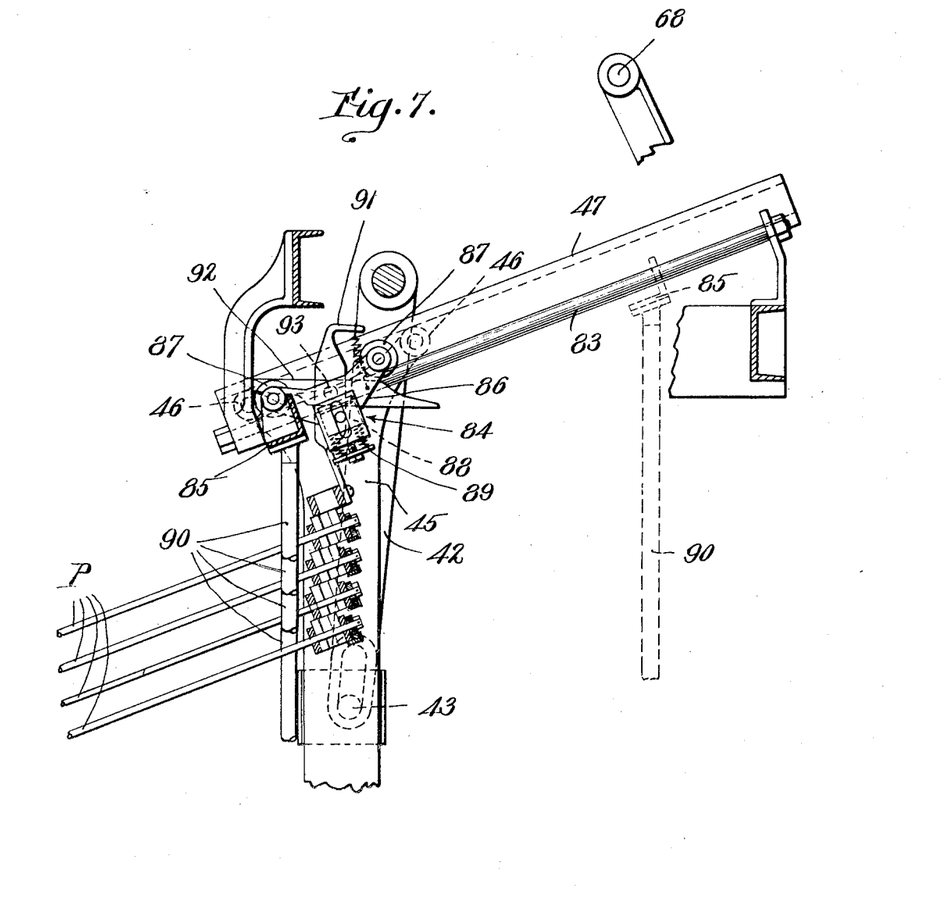
Figure 7 is a sectional detail illustrating the positions of some of the parts of the picker mechanism when the picker elements, hereinafter described, are fully projecting into the plants of the row.

Above each bank of picker elements P are arranged two inclined rails 83 Figs. 1, 4 and 7, each of which is fixed at its opposite ends to the frame of the machine. These rails 83 are parallel with the runways 47 and support a stripper carriage 84 including a longitudinally disposed bar 85 at each end of which is provided a yoke or head 86 having a pair of trucks or rolls 87 adapted to travel upon the top side of the adjacent rail 83, and with a shoe 88 that is yieldingly but firmly pressed against the bottom side of said rail by springs 89. The springs 89 act through the shoe 88 to yieldingly hold the stripper carriage 84 in whatever position it may occupy on the rails 83.

To the under side of the bar 85 of carriage 84 are secured the upper ends of a longitudinal row of stripper rods 90 which occupy positions between the vertical rows of picker elements P. That is, between each two adjacent vertical rows of picker elements P is arranged one of the vertically disposed stripper rods 90, and as shown in Fig. 4 all of these rods extend to the bottom of the bank of picker elements.

At the completion of each cycle of the machine the stripper carriage 84 occupies a position near, but a short distance away from, the lower inner ends of the rails 83 as shown in Fig. 4. When, at the start of each cycle of the machine the picker carriage 44 is moved downwardly and inwardly to shove the picker stems or elements P into the row of plants, a bracket 91, Fig. 4, fast on the picker carriage strikes the bar 85 of the stripper carriage 84 and shoves the latter to the limit of its inward movement where it is shown by full lines in Fig. 7.

As the bracket 91 comes into engagement with the stripper carriage 84 a latch 92 pivotally mounted at 93 on bracket 91 enters into interlocking engagement with the bar 85 of the stripper carriage 84 so that when the picker carriage 44 is moved outwardly to strip the cotton from the plants the latch 92 carries the stripper carriage 84 with it. Thus at the completion of the outward movement of the picker carriage 44, the stripper rods 90 occupy the positions indicated by the dotted lines in Fig. 7.

As the picker carriage 44 reaches the limit of its outward and upward movement, the tail of the latch 92 engages an abutment bracket 94 on the frame of the machine which operates to raise the hooked end of latch 92 so as to disengage the same from the bar 85 of the stripper carriage 84.

The tripping of latch 92 occurs just as the picker carriage 44, loaded with the picked cotton, reaches the limit of its outward, retracting, movement and immediately thereafter a pair of arms 95 fixed upon a rock shaft 96 are swung downwardly and inwardly and operate, by engagement with the bar 85, to shove the stripper carriage 84 down the rails 83 into the position shown in Fig. 4 thereby stripping the cotton from the picker stems P so that it will fall by gravity on to the upper stretch of the adjacent endless conveyor belt 16. This downward stripping movement of the stripper rods 90 occurs immediately after the picker stems P have been reversely rotated by the lever 56, Fig. 3, to unwind the cotton therefrom.

The rock shaft 96 is turned in one direction by a cam 97 fast on the shaft 68, above referred to, acting through a lever 98 that is fulcrumed at 99 on the frame of the machine and connected by a link 100 with an arm 101 fast on rock shaft 96, while a spring 102 connected with an arm 103 fast on rock shaft 96 serves to turn the said rock shaft 96 in the opposite direction when permitted by the cam 97.

Longitudinal rails 104 provided upon the inner side of each section of the machine serve to properly direct the branches of the plants into position between the two sections of the machine and to hold the same in accessible positions while the machine is operating.

The cam drum 33 at the opposite side of the machine has associated with it picking mechanism such as that which has been described in connection with the drum 32, and as hereinabove pointed out the two picking mechanisms of the machine, one at one side thereof and the other at the opposite, are timed relatively so that the picker elements or stems P of the mechanism at the right hand side of the machine, Fig. 3, are first moved downwardly into the plants and then as said picker elements or stems start upon their movement out of the plants the picker elements or stems P at the opposite side of the machine start upon their downward and inward movement at the same speed as that at which the other picker elements are being withdrawn.

When the machine is in operation it is positioned with one bank or group of picker elements P at one side of the row of plants and the other bank or group at the opposite side thereof. At the start of each cycle of operations the picker stems of the group upon the right hand side of the machine are moved endwise inwardly and downwardly into the plants to the limit of their movement in that direction whereupon each picker stem is rotated as described in a right hand direction thereby engaging and winding on to the stem whatever cotton is in contact therewith.

Immediately upon the completion of the first rotary movement of the picker stems, the latter are retracted and as the carriage 44 is retracted the latches 92 carry the stripper carriage 84 with it so that when the picker carriage 44 reaches its outermost position again the stripper carriage 84 is adjacent the outer ends of the picker stems and in position to be engaged by the arms 95 which then shove said stripper carriage inwardly along the rails 83 thereby restoring the stripper carriage to its intermediate position shown in Fig. 4.

Immediately before this return movement of the stripper carriage 84, and while the same is occupying the position shown by dotted lines in Fig. 7, all of the picker stems are reversely rotated in a left hand direction to unwind the cotton from each stem, to doff the cotton from the barbs thereof, and to sheathe said teeth or barbs so that when the stripper carriage 84 is immediately thereafter moved inwardly, its depending rods 90 will shove all of the cotton that has been picked down to the lower ends of the stems where, as shown in Fig. 4, it is in position to fall upon the endless conveyor 16.

As the picker stems upon the right hand side of the machine start to move outwardly as just explained, the picker stems of the group or bank upon the left hand side of the machine start to move inwardly so that for a short period of time both groups of picker stems are being moved endwise, one outwardly and the other inwardly at the same speed.

As the picker stems upon the right hand side of the machine reach the limit of their retracting movement the picker stems upon the left hand side of the machine reach the limit of their movement toward or into the plants. It will be understood that the picker stems upon the left hand side of the machine are then rotated to engage the cotton and are then withdrawn from the plants and reversely rotated to free the picked cotton which is discharged upon the other conveyor belt 16 by the stripping mechanism at that side of the machine, the same as already described in connection with the mechanism upon the right hand side of the machine.

At the completion of the operation of the picker mechanism upon the left hand side of the machine the latter is automatically propelled forward over the ground a distance which is slightly less than the length of the groups or banks of picker stems, while the latter dwell at rest.

The motor M including its crank shaft m' and the shaft m is of a standard type such as is employed in tractors and the crank shaft m' operates at four times the speed of the shaft m by which the main shaft 10 of the machine is driven.

The clutch 26 may be a disc clutch of ordinary construction.

The only structural difference between the picker mechanisms upon the opposite sides of the machine is that on the right hand side of the machine the rack-bars 51 are disposed each beneath its row of pinions while each coresponding rack-bar upon the left hand side of the machine is disposed above its row of pinions.

When the above described harvesting machine is to be driven over the ground continuously, as when moving the same from one place to another, the control member A is manually set in the position shown in Fig. 3, whereby the main shaft 10 is maintained at rest with the two cams 33' and 34 out of engagement with the lever 30. This leaves the clutch lever B free to be controlled and operated by the driver of the vehicle who starts, stops and reverses the vehicle by means of control member C, the direction of travel of the vehicle over the ground being controlled by him through the hand wheel D. The transmission T is constructed with the usual brake mechanism that is operated and controlled by the driver of the vehicle by means of a hand lever E.

Associated with each lever 57 is a dash pot 111a whose piston 110a is connected with the lower arm of each lever 57 so as to yieldingly regulate or control the movement of said arm under the influence of its spring 73. Each dash pot 111a has an inwardly opening check valve 112 connected with one end thereof so that air is admitted freely to the dash pot as cam 62 swings said lever 57 on its fulcrum.

As indicated in Fig. 1 and shown in Fig. 3, the conveyor belt 16 may be provided with barbs or spikes 113 to engage with the cotton that is delivered on to the same.

What we claim is:

1. A cotton harvesting machine comprising a vehicle; picker mechanism mounted on said vehicle; means including a motor for intermittently propelling the vehicle over the ground alongside a row of plants and mechanism operated by said motor for automatically operating said picker mechanism during each period of rest of said vehicle and by which said picker mechanism is maintained inactive during each forward movement of said vehicle.

2. A cotton harvesting machine comprising a vehicle; picker mechanism mounted on said vehicle including two groups of picker elements, one at each side of the row of plants traversed by said vehicle; means for intermittently propelling the vehicle over the ground and mechanism for successively operating said groups of picker elements during each period of rest of said vehicle.

3. A cotton harvesting machine comprising a vehicle; picker mechanism mounted on said vehicle including two groups of picker elements; automatic means for intermittently propelling said vehicle over the ground with one group of picker elements disposed at one side of a row of plants and the other group of picker elements disposed at the opposite side of said row, and mechanism for automatically operating said groups of picker elements successively during each period of rest of the vehicle so that one group is projected into said row as the other group is withdrawn therefrom.

4. A cotton harvesting machine comprising a vehicle; picker mechanism mounted on said vehicle including two groups of normally retracted picker stems movable with the vehicle one on each side of a row of plants; automatic means for intermittently propelling said vehicle along said row, and mechanism for successively and automatically operating said picker stems during each period of rest of said groups of vehicle so as to reciprocate the stems of both groups endwise into and out of the said row of plants.

5. A cotton harvesting machine comprising a vehicle; picker mechanism mounted on said vehicle including two groups of normally retracted picker stems movable with the vehicle one on each side of a row of plants; automatic means for intermittently propelling said vehicle along said row, and mechanism for operating said groups of picker stems successively during each period of rest of said vehicle so as to reciprocate the stems thereof endwise into and out of the plants, and so that one group of picker stems is first moved into the plants and then as said group is being retracted the picker stems of the other group are moved endwise into the plants.

6. A cotton harvesting machine comprising a vehicle; picker mechanism mounted on said vehicle including a plurality of rotatable and endwise movable normally retracted picker stems; automatic means including a motor for intermittently moving said vehicle along a row of plants, and means operating automatically during each period of rest of the vehicle to shift said picker stems endwise into the plants of said row, then to rotate said picker stems to engage the same with the cotton of said plants, then to shift said picker stems endwise to withdraw the same from the plants, and lastly, to reversely rotate said picker stems to free the picked cotton therefrom, said last mentioned means being driven by said motor and serving also to maintain said picker mechanism inactive with its picker stems retracted during each forward movement of said vehicle.

7. A cotton harvesting machine comprising a traction vehicle; a motor on said vehicle; picker mechanism mounted on said vehicle and movable with the latter along a row of plants; means through which said motor automatically propels said vehicle intermittently along said row a predetermined distance and means through which said motor automatically operates said picker mechanism during each period of rest of the vehicle.

8. A cotton harvesting machine comprising a traction vehicle; a motor on said vehicle; picker mechanism mounted on said vehicle movable with the latter along a row of plants; means through which said motor automatically propels said vehicle intermittently along said row; means through which said motor automatically operates said picker mechanism during each period of rest of the vehicle, and a manually operated control member for said last mentioned means by which said picker mechanism is thrown into and out of action.

9. A cotton harvesting machine comprising a traction vehicle; a motor mounted on said vehicle; picker mechanism mounted on said vehicle movable with the latter along a row of plants; driving mechanism through which said motor propels said vehicle, said driving mechanism including a clutch; means for automatically controlling and operating said clutch to cause said motor to propel said vehicle along said row intermittently, and means through which said motor automatically operates said picker mechanism during each period of rest of said vehicle.

10. A cotton harvesting machine comprising a traction vehicle; a motor on said vehicle; picker mechanism mounted on said vehicle movable with the latter along a row of plants; driving mechanism through which said motor automatically propels said vehicle intermittently along said row, means through which said motor automatically operates said picker mechanism during each period of rest of said vehicle, and a clutch that is operable to throw said operating means into and out of action.

11. A cotton harvesting machine comprising a traction vehicle; a motor mounted on said vehicle; picker mechanism mounted on said vehicle movable with the latter along a row of plants; driving mechanism through which said motor propels said vehicle, said driving mechanism including a clutch that is automatically operated to cause said motor to propel said vehicle along said row intermittently, means through which said motor automatically operates said picker mechanism during each period of rest of said vehicle, and a clutch that is operable to throw said operating means into and out of action.

12. A cotton harvesting machine comprising a traction vehicle; a motor on said vehicle; picker mechanism mounted on said vehicle movable with the latter along a row of plants; means through which said motor automatically propels said vehicle intermittently along said row, said means being manually adjustable so as to operate to continuously propel the vehicle over the ground; means through which said motor automatically operates said picker mechanism during each period of rest of the vehicle; a manually operated control member by which said picker mechanism is thrown into and out of action so that said picker mechanism can be rendered in-operative when the vehicle is continuously propelled, and means through which said vehicle propelling means is manually controlled to start, stop, reverse and steer the vehicle when said propelling means is in condition to impart continuous movement to the vehicle and said picker mechanism is out of action.

13. A cotton harvesting machine comprising a traction vehicle; a motor on said vehicle; picker stems mounted on said vehicle movable with the latter along a row of plants; means through which said motor propels said vehicle intermittently along said row including a clutch; means through which said motor automatically operates said picker stems during each period of rest of said vehicle, said means including a continuously rotating shaft, and means through which said continuously rotating shaft operates and controls said clutch to cause said vehicle propelling means to move said vehicle intermittently along said row.

14. A cotton harvesting machine constructed in accordance with claim 13, wherein means including a manually adjustable clutch is provided through which said continuously rotating shaft is connected with and driven by said motor, and wherein said picker stem operating means includes cams that are rotated by said shaft and mechanism through which said cams act to reciprocate said stems endwise and also rotate the same.

15. A cotton harvesting machine comprising a traction vehicle; a motor on said vehicle; a plurality of picker stems arranged in rows; a carriage on which said picker stems are rotatably mounted, said carriage being mounted on said vehicle so as to be movable thereon toward and from a row of plants traversed by the latter, and each of said picker stems being provided with a gear; a rack-bar engaging the gears of each row of picker stems; means through which said motor operates to intermittently propel said vehicle along said row; a main shaft continuously driven by said motor; means through which said main shaft operates said carriage to reciprocate said picker stems endwise during each period of rest of said vehicle; and means operated by said main shaft for reciprocating said rack-bars in timed relation with the endwise movements of said picker stems.

16. A cotton harvesting machine constructed in accordance with claim 15 wherein the means through which said motor intermittently propels said vehicle includes a clutch that is automatically operated by said main shaft.

17. A cotton harvesting machine comprising a traction vehicle; a motor on said vehicle; a plurality of picker stems arranged in rows; a carriage on which said picker stems are rotatably mounted, said carriage being mounted on said vehicle so as to be movable thereon toward and from a row of plants traversed by the latter, and each of said picker stems being provided with a gear; a rack-bar engaging the gears of each row of picker stems; means through which said motor operates to intermittently propel said vehicle along said row, said means including a clutch; a main shaft continuously driven by said motor; means through which said main shaft controls and operates said clutch to effect the intermittent movement of the vehicle over the ground; means through which said main shaft operates said carriage to reciprocate said picker stems endwise during each period of rest of said vehicle, and means operated by said main shaft for reciprocating said rack-bars in timed relation with the endwise movements of said picker stems.

Signed by us at Boston, Suffolk County, Massachusetts this 1st day of October 1929.

HARRIS G. PROUTY.
JOSEPH BARDWELL.

CERTIFICATE OF CORRECTION.

Patent No. 1,907,665.                                                    May 9, 1933.

HARRIS G. PROUTY, ET AL.

It is hereby certified that error appears in the printed specification of the above numbered patent requiring correction as follows: Page 7, line 93, claim 4, strike out the words "groups of" and insert the same after "said" in line 92; and that the said Letters Patent should be read with this correction therein that the same may conform to the record of the case in the Patent Office.

Signed and sealed this 22nd day of August, A. D. 1933.

M. J. Moore.

(Seal)                                                        Acting Commissioner of Patents.